(12) United States Patent
Sugiura

(10) Patent No.: US 10,914,454 B2
(45) Date of Patent: Feb. 9, 2021

(54) GUIDE LIGHT IRRADIATION DEVICE

(71) Applicant: TOPCON CORPORATION, Tokyo (JP)

(72) Inventor: Akinobu Sugiura, Tokyo (JP)

(73) Assignee: TOPCON CORPORATION, Tokyo (JP)

( * ) Notice: Subject to any disclaimer, the term of this patent is extended or adjusted under 35 U.S.C. 154(b) by 0 days.

(21) Appl. No.: 16/817,098

(22) Filed: Mar. 12, 2020

(65) Prior Publication Data
US 2020/0309351 A1    Oct. 1, 2020

(30) Foreign Application Priority Data

Mar. 29, 2019   (JP) .................................. 2019-067257

(51) Int. Cl.
| | |
|---|---|
| *F21V 13/04* | (2006.01) |
| *F21V 5/00* | (2018.01) |
| *F21V 7/00* | (2006.01) |
| *G01C 15/00* | (2006.01) |
| *G01C 15/12* | (2006.01) |

(52) U.S. Cl.
CPC ................ *F21V 13/04* (2013.01); *F21V 5/00* (2013.01); *F21V 7/00* (2013.01); *G01C 15/004* (2013.01); *G01C 15/12* (2013.01)

(58) Field of Classification Search
CPC .... G01C 15/12; G01C 15/002; G01C 15/004; F21V 7/041; F21V 9/083; F21V 14/025; F21W 2111/02; F21S 6/005; F21Y 2115/10; F21Y 2103/10; G01B 11/00
See application file for complete search history.

(56) References Cited

U.S. PATENT DOCUMENTS

| | | | | |
|---|---|---|---|---|
| 7,861,423 | B2 * | 1/2011 | Kumagai | G01S 7/4812 33/281 |
| 2005/0077454 | A1 * | 4/2005 | Ohtomo | G01C 15/006 250/221 |
| 2009/0241359 | A1 * | 10/2009 | Hayashi | G01S 17/42 33/284 |

(Continued)

FOREIGN PATENT DOCUMENTS

| | | |
|---|---|---|
| EP | 2843363 A1 | 3/2015 |
| JP | 05-028925 U | 4/1993 |
| JP | 2012-202821 A | 10/2012 |

*Primary Examiner* — Peggy A Neils
(74) *Attorney, Agent, or Firm* — Roberts Calderon; Safran & Cole P.C.

(57) ABSTRACT

A guide light irradiation device to irradiate guide light to indicate a direction to a survey operator, includes a plurality of irradiators configured to each irradiate guide light differing in pattern between the left and the right of an irradiation direction as a center, the plurality of irradiators are juxtaposed in a left-right direction, and irradiation units of the plurality of irradiators are disposed so that the irradiation units match in the horizontal direction, and optical axes of the plurality of irradiators make a predetermined angle with each other in the vertical direction. Synthetic light of the respective guide lights has brightness obtained by summing brightnesses of the light sources of the respective irradiators, and has a fan shape extending in the vertical direction. A distance at which the light is visually recognized is long, and the guide light is easily found even at a location with level differences.

5 Claims, 10 Drawing Sheets

(56) References Cited

U.S. PATENT DOCUMENTS

| 2010/0135010 A1* | 6/2010 | Liu ........................... F21V 5/04 |
| | | 362/231 |
| 2012/0242830 A1 | 9/2012 | Kumagai et al. |
| 2019/0120622 A1* | 4/2019 | Miller .................. G01C 15/008 |

* cited by examiner

GUIDE LIGHT IRRADIATION DEVICE

TECHNICAL FIELD

The present invention relates to a guide light irradiation device to irradiate guide light for guiding a survey operator.

BACKGROUND ART

Conventionally, a guide light irradiation device that indicates, on a survey site, a piling point to a survey operator holding a surveying pole by irradiating guide light is known. For example, in Patent Literature 1, light-emitting diodes are turned on in colors different between the left and the right of a boundary set to a collimation axis within a horizontal plane, and a survey operator is guided to a position at which left and right guide lights in different colors are equally viewable so that the operator can quickly move to the neighborhood of a survey setting point as a target point. A fan-shaped laser beam extending long in the up-down direction is used as guide light, and the guide light is easily found even on a survey site with level differences.

CITATION LIST

Patent Literature

[Patent Literature 1] Japanese Published Unexamined Patent Application Publication No. 2012-202821

SUMMARY OF THE INVENTION

Technical Problem

However, fan-shaped guide light extending in the up-down direction is created by expanding a guide light irradiation range in the up-down direction by using a cylindrical lens in a guide light irradiation optical system, and this poses a problem in which a guide light reach distance (distance at which a survey operator can visually recognize the guide light) is shortened by diffusion of the guide light.

The present invention was made in view of this problem, and provides a guide light irradiation device with an extended guide light reach distance and a guide light irradiation range expanded in the up-down direction.

Solution to Problem

Therefore, in an aspect of the present invention, a guide light irradiation device to irradiate guide light to indicate a direction to a survey operator, includes a plurality of irradiators configured to each irradiate guide light differing in pattern between the left and the right of an irradiation direction as a center, the plurality of irradiators are juxtaposed in a left-right direction, and irradiation units of the plurality of irradiators are disposed so that the irradiation units match in the horizontal direction, and optical axes of the plurality of irradiators make a predetermined angle with each other in the vertical direction, and the guide light irradiation device is configured so that synthetic light of guide lights respectively irradiated from the plurality of irradiators is irradiated as synthetic guide light.

With this configuration, guide lights are irradiated from the respective irradiators disposed in the left-right direction, and are recognized from a distance as synthetic guide light obtained by summing brightnesses of light sources of the respective irradiators, so that a guide light reach distance can be lengthened, and the irradiators are disposed so that irradiation directions are set upward and downward, and therefore, a guide light irradiation range can be extended in the up-down direction.

According to a certain aspect, each of the plurality of irradiators includes a pair of light sources configured to emit lights for left and right patterns of the guide light, an optical member configured to form lights emitted from the pair of light sources as light differing in pattern between the left and the right, and a projector lens as the irradiation unit configured to transmit the guide light. In this aspect, the irradiator can irradiate guide light as light that differs in pattern between the left and the right.

According to a certain aspect, the predetermined angle in the vertical direction between the optical axes of the plurality of irradiators is configured to become smaller than a diffusion angle of the guide light in the vertical direction in a single one of the irradiators. With this configuration, generation of a gap not covered by irradiation ranges of the plurality of guide lights can be prevented.

In a certain aspect, a distance between the irradiation units of the plurality of irradiators is configured so that an angle between line segments from a point at an assumed use distance of the guide light irradiation device to the respective irradiation units becomes 1 arc-minute or less. In this aspect, in a range in which irradiation ranges overlap, lights irradiated from the respective light sources are viewed as being summed, so that the guide light reach distance is extended. This enables use at a location with large level differences, and brings about an effect of enabling the guide light to be easily found.

Effect of Invention

As is clear from the description above, according to the present invention, guide light the reach distance of which is extended, and which extends in the up-down direction, is irradiated, so that an effect of enabling the guide light to be easily found is obtained.

BRIEF DESCRIPTION OF THE DRAWINGS

FIG. 2A is a horizontal sectional view, and FIG. 2B is a schematic left side view.

FIG. 3A is a perspective view, FIG. 3B is a front view, and FIG. 3C is a left side view.

FIG. 6A is given for comparison and illustrates guide light irradiated from a single irradiator, and FIG. 6B illustrates synthetic guide light irradiated from a guide light irradiation device with two irradiators.

FIG. 7A is a perspective view, FIG. 7B is a front view, and FIG. 7C is a left side view.

DESCRIPTION OF EMBODIMENTS

Hereinafter, detailed embodiments of the present invention will be described with reference to the drawings. The embodiments do not limit the invention but are illustrations of the invention, and all features and combinations of the features described in the embodiments are not always essential for the present invention.

(Outline of Invention)

Figure 1:
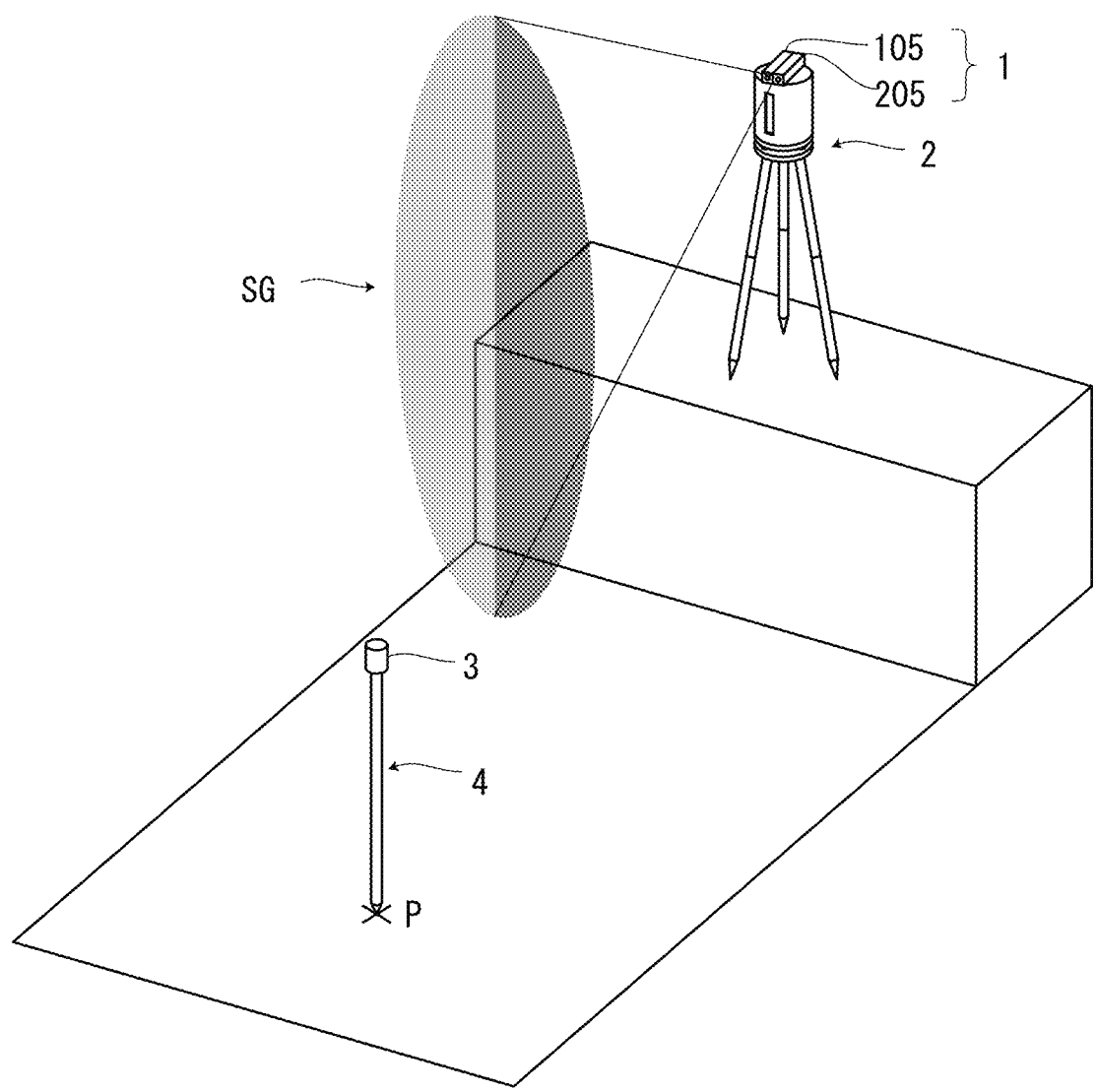
FIG. 1 is a schematic perspective view to illustrate an outline of a guide light irradiation device according to a first embodiment.

FIG. 1 is an explanatory view to illustrate an outline of a guide light irradiation device 1 according to the present invention. The guide light irradiation device 1 is a device capable of irradiating synthetic guide light SG consisting of lights different in pattern between the left and the right of a vertical plane including a center of an irradiation direction, and is equipped in a total station 2 having a distance and angle measuring function.

The guide light irradiation device 1 includes irradiators 105 and 205 juxtaposed left and right. Synthetic light of lights irradiated from the respective irradiators 105 and 205 is irradiated as the guide light SG from the guide light irradiation device 1.

The guide light irradiation device 1 is attached so that an irradiation direction of synthetic guide light SG and a collimation direction of the guide light irradiation device 1 substantially match in the horizontal direction. The guide light irradiation device 1 is configured to move along with movement of the total station 2 in the collimation direction, and the synthetic guide light SG that differs in pattern between the left and the right of a vertical plane of a collimation axis of the total station 2 as a boundary, and has a fan shape extending in the up-down direction, is irradiated.

As an example of detailed usage, first, the total station 2 is installed at a known point and collimated toward a piling point P, and irradiates the synthetic guide light SG by the guide light irradiation device 1. An operator who holds a pole 4 equipped with a prism 3 as a target of the total station 2 can determine which side the operator should move to, the left or the right by himself/herself according to a pattern of the synthetic guide light SG viewable from the guide light irradiation device 1. For example, in the present embodiment, the synthetic guide light SG is configured so that, as viewed from an operator side, red light is viewed at the right side, and green light is viewed at the left side. Therefore, when the operator recognizes red light, the operator is on the right side relative to the piling point P. Accordingly, it is only necessary to face the total station 2 and move leftward from a current location. In this way, an operator is guided to a collimation direction of the total station 2 that is a direction in which left and right colors of the synthetic guide light SG are equally viewable. After direction guidance to the piling point P is made, the piling point P can be set by measuring the distance of the prism 3 at the total station 2 and confirming the distance.

The synthetic guide light SG is high in luminosity, and a range of use of the guide light irradiation device 1 (distance and range in which an operator can visually recognize the synthetic guide light SG) is comparatively large. In addition, as illustrated in FIG. 1, the synthetic guide light SG is fan-shaped light extending long in the vertical direction, so that even when there is a level difference between the installation position of the total station 2 and the piling point P as illustrated in FIG. 1, an operator can visually recognize the synthetic guide light SG. The synthetic guide light SG is bright, and a range in which the synthetic guide light SG is visually recognized is large, so that an operator can easily find the synthetic guide light SG.

For the synthetic guide light SG, lights in various patterns can be used such as, in addition to lights in colors different between the left and the right, a combination one of which being blinking light and the other being continuous light, or lights different in blinking period between the left and the right.

First Embodiment

The guide light irradiation device 1 according to the first embodiment includes the irradiators 105 and 205 capable of each irradiating guide light that differs in pattern between the left and the right. The irradiators have the same configuration, so that a configuration of the irradiator 105 is described as representative with reference to FIGS. 2A and 2B.

Figure 2A:
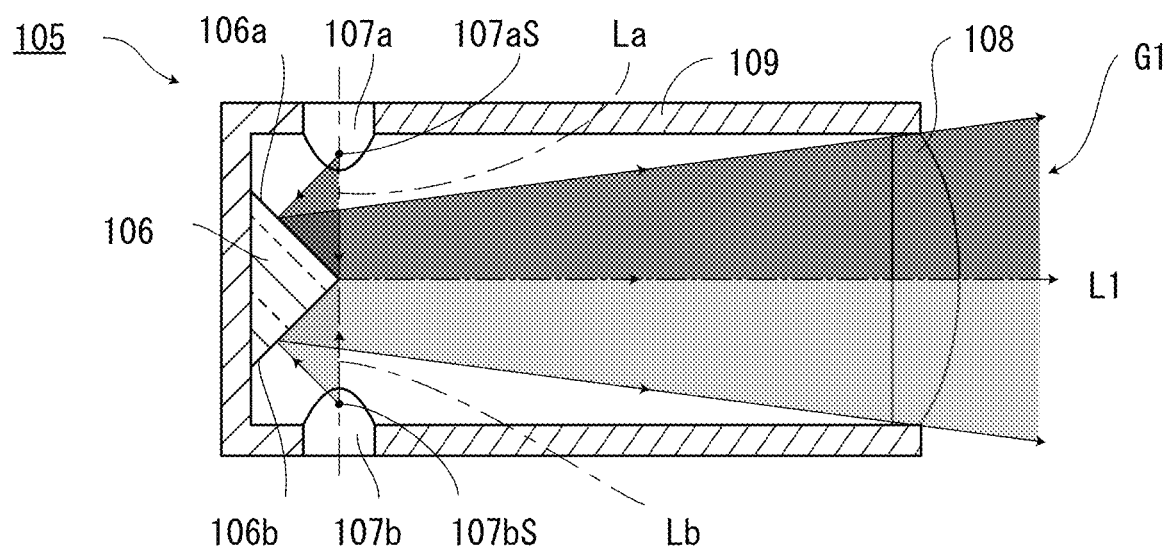
FIGS. 2A and 2B illustrate irradiators to be equipped in the same guide light irradiation device.
Figure 2B:
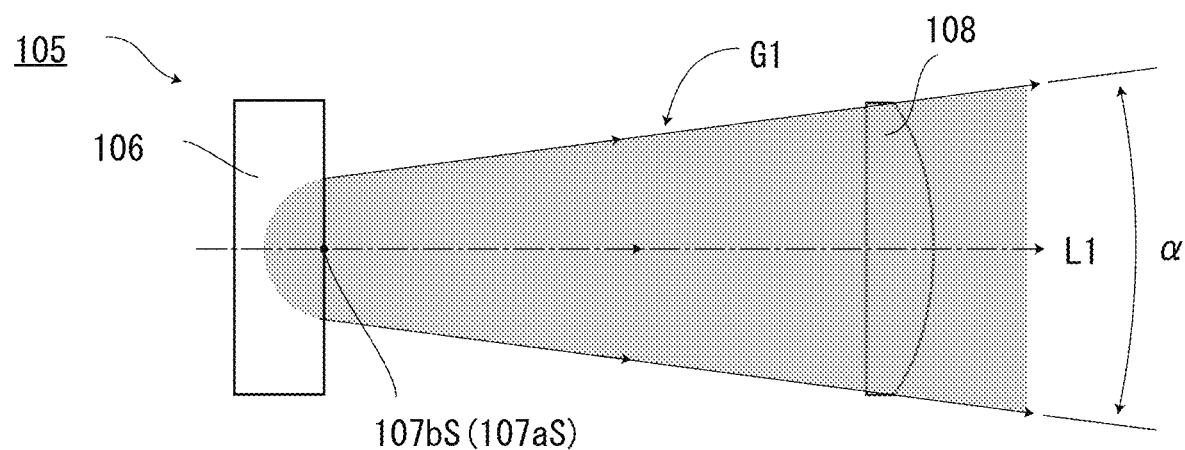

FIGS. 2A and 2B illustrate the irradiator 105, and FIG. 2A is a cross sectional view (horizontal sectional view) of the irradiator 105, and FIG. 2B is a side view to illustrate irradiation light (guide light G) of the irradiator 105. In FIGS. 2A and 2B, irradiation light is colored to describe a state of the guide light (the same applies to FIG. 5 and FIG. 9 described later). In FIG. 2B, light-emitting diodes 107a and 107b are omitted, and only light sources 107aS and 107bS are illustrated, and a housing is also omitted (the same applies to FIG. 5 and FIG. 9 described later). Dispositions of the light sources 107aS and 107bS match in a side view, so that one disposed at the rear side is expressed using parentheses. In the respective drawings including drawings described later, each angle does not reflect an actual ratio, and the configuration is schematically illustrated.

As illustrated in FIG. 2A, the irradiator 105 includes, as optical systems, a pair of light-emitting diodes 107a and 107b, a right-angle mirror 106, and a lens 108 that is a collimating lens as a condenser lens. These optical systems are held in a housing 109. The right-angle mirror 106 has reflecting surfaces 106a and 106b, and they make a right angle with each other. The lens 108 is fixed to a tip end opening of the box-shaped housing 109, and the right-angle mirror 106 is disposed so that a ridge of the reflecting surfaces 106a and 106b matches a vertical line passing through a rear focal point of the lens 108 on an optical axis L1 of the lens 108.

The reflecting surfaces 106a and 106b face the lens 108 side, and tilt at equal angles in directions opposite to the optical axis L1.

The red light-emitting diode 107a is disposed on a reflecting optical axis La of one reflecting surface 106a, and the green light-emitting diode 107b is disposed on a reflecting optical axis Lb of the other reflecting surface 106b, respectively.

Red light irradiated from the light source 107aS of the red light-emitting diode 107a is reflected by the reflecting surface 106a, and green light irradiated from the light source 107bS of the green light-emitting diode 107b is reflected by the reflecting surface 106b, respectively, and are irradiated as guide light G1 from the lens 108 while being divided into two emission colors by the vertical line at the optical axis L1.

As illustrated in FIG. 2B, the guide light G1 that has exited from the lens 108 is irradiated forward in an irradiation direction set to the optical axis L1 while being diffused at a diffusion angle (expansion angle) a in the vertical direction. An apex of the right-angle mirror 106 is disposed at an image forming position (rear focal point) when looking into the lens 108 from a distance, so that a boundary between the red light and the green light can be projected sharply and clearly.

Figure 3A:
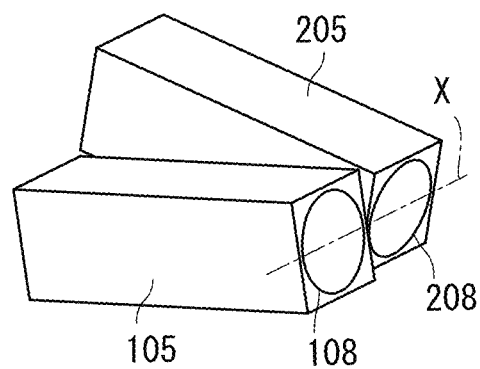
FIGS. 3A, 3B, and 3C illustrate the same guide light irradiation device, and are explanatory views to describe dispositions of irradiators.
Figure 3B:
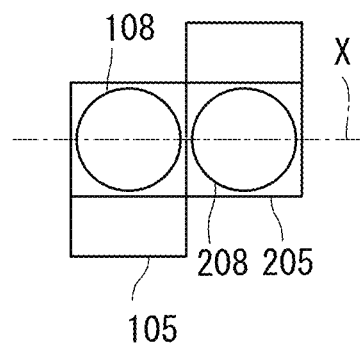
Figure 3C:
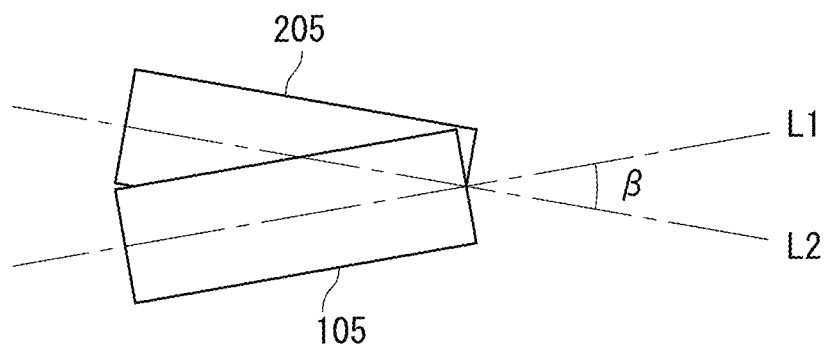
Figure 4:
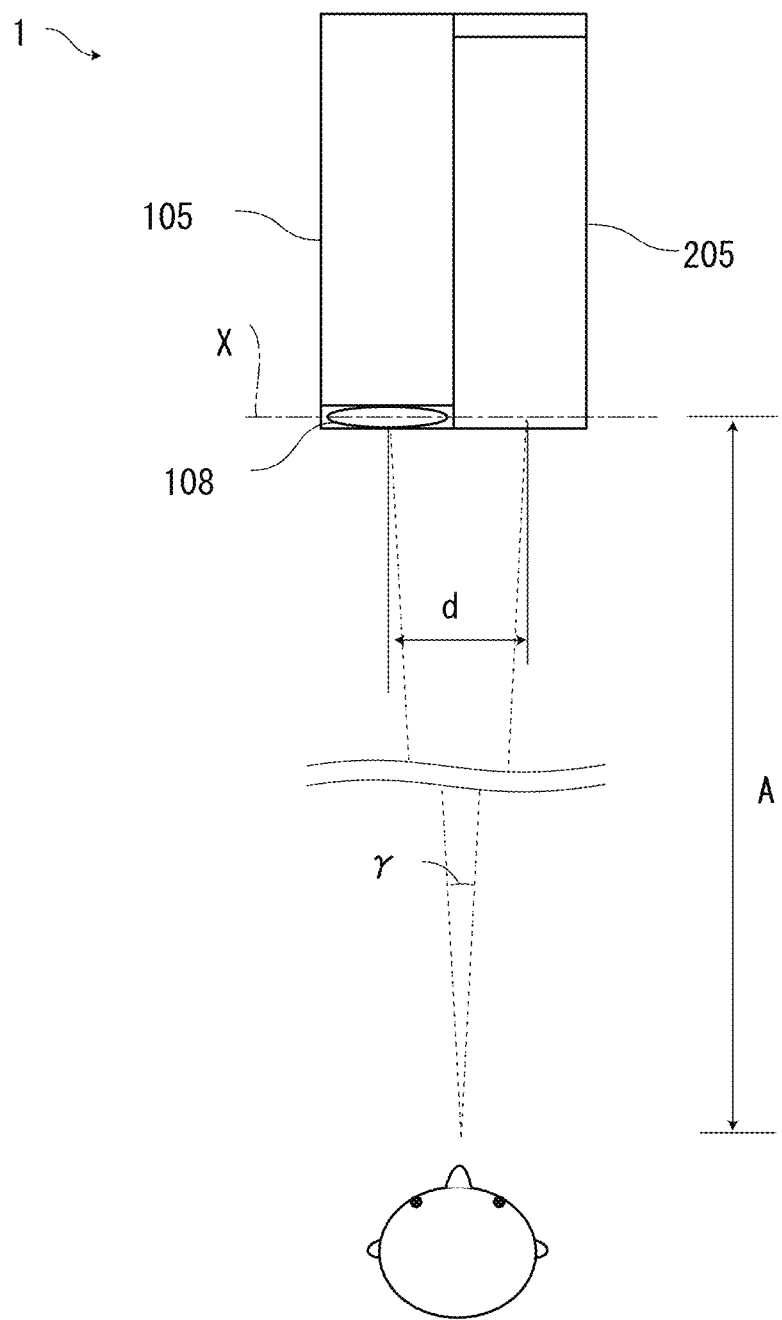
FIG. 4 is a plan view of the same guide light irradiation device.
Figure 5:
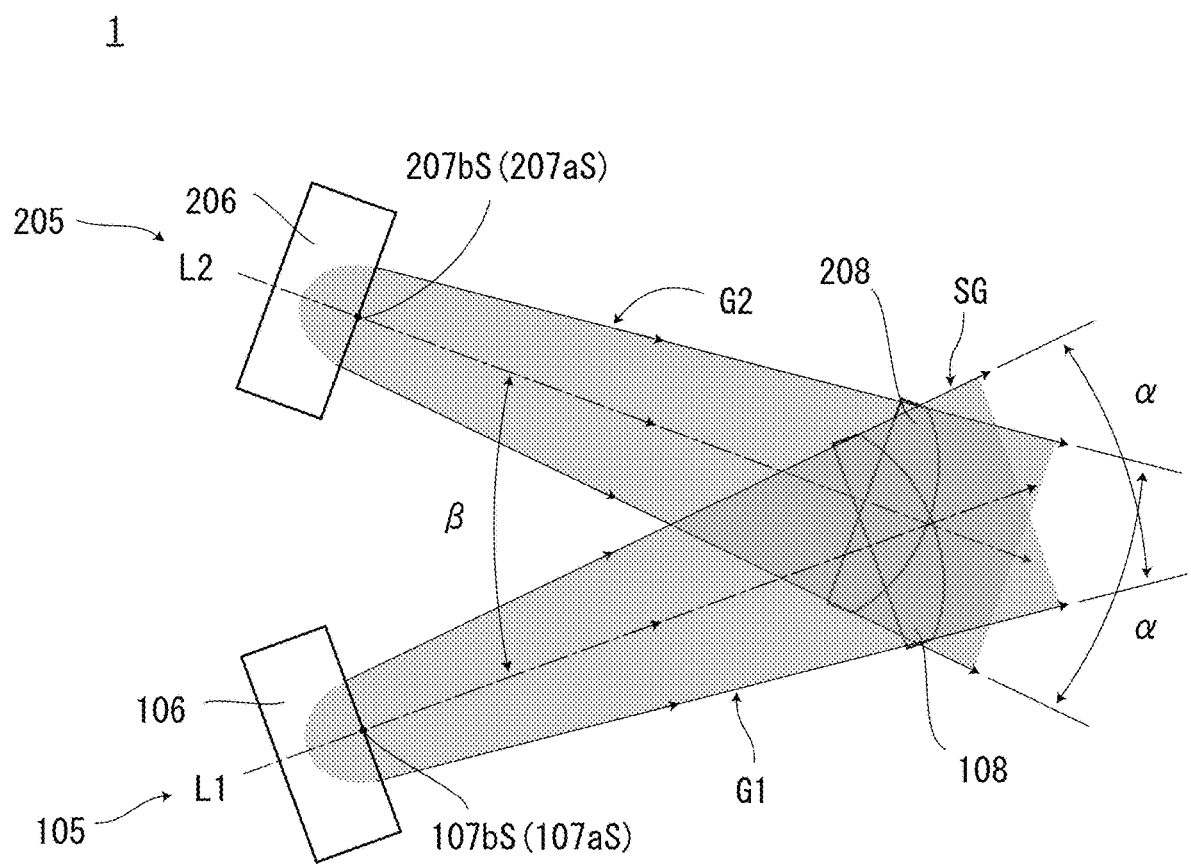
FIG. 5 is a schematic left side view of the same guide light irradiator, and is an explanatory view to describe a state of irradiation lights and dispositions of components.

In the guide light irradiation device 1, two irradiators 105 and 205 having the configuration described above are disposed adjacent to each other in the left-right direction. All of FIGS. 3A, 3B, 3C, 4, and 5 illustrate the guide light irradiation device 1, and FIG. 3A is a perspective view, FIG. 3B is a front view, FIG. 3C is a left side view, and FIG. 4 is a plan view, and are respectively explanatory views to describe dispositions of the irradiators. FIG. 5 is a schematic left side view to describe a state of irradiation lights and dispositions of components.

As illustrated in FIG. 3A and FIG. 3B, the irradiators 105 and 205 are disposed adjacent to each other in the left-right direction, and are disposed by being rotated the same angle around an axis X passing through the centers of the lenses 108 and 208 of the respective irradiators in directions opposite to each other so as to lean the end portion sides with the lenses 108 and 208 close to each other, and optical axes L1 and L2 of the irradiators make a predetermined angle β with each other in the vertical direction. Here, the angle β is adjusted so as to become smaller than diffusion angles α (refer to FIG. 2B) of guide lights G1 and G2 in the vertical direction. With this configuration, the guide lights G1 and G2 always partially overlap each other, so that a gap not covered by the irradiation ranges of the irradiators 105 and 205 can be prevented from being generated in the synthetic guide light SG as synthetic light of the guide lights.

As illustrated in FIG. 4, a disposition distance d between the irradiators (distance between centers of the lenses 108 and 208 of the irradiators 105 and 205) is set so that, on the assumption that an assumed use distance of the guide light irradiation device 1 is defined as an assumed use distance A, an angle γ ($\gamma = \tan^{-1}(d/A)*180/\pi$) between line segments from a point at the assumed use distance A from the device to the respective lenses 108 and 208 becomes 1 arc-minute (1/60 degrees) or less. This is because, since an angle resolution (visual angle) of a human eye having 20/20 vision is 1 arc-minute, when a plurality of light sources are present in a range of a visual angle of 1 arc-minute or less, the light sources are viewed as not individual light sources but one light source as a sum of brightnesses of the respective light sources viewed singly. That is, by setting the angle γ to 1 arc-minute or less, lights irradiated from the irradiators 105 and 205 are viewed as being summed for an operator, and an effect of extending a reach distance of the synthetic guide light SG is obtained.

The assumed use distance A is determined according to specifications such as a reach limit distance of light determined from luminances of light-emitting diodes and lenses to be used, and use conditions such as a requested permissible level difference.

As illustrated in FIG. 5, the irradiator 205 is configured similarly to the irradiator 105, and a right-angle mirror 206 is disposed on the optical axis L2 of the lens 208, lights emitted from the light sources 207aS and 207bS are formed as the guide light G2 that differs in pattern between the left and the right of a vertical axis by the right-angle mirror 206, and irradiated forward along the optical axis L2 from the lens 208.

The irradiators 105 and 205 are disposed adjacent to each other in the left and right, so that in FIG. 5 being a left side view, the irradiator 105 is disposed at a front side, and the irradiator 205 is disposed at the back side. Regarding the lenses 108 and 208 whose dispositions overlap in a left side view, the lens 108 is disposed at the front side. The components of the irradiator 105 are independent of the components of the irradiator 205, and the components of the irradiator 105 and the components of the irradiator 205 do not interfere with each other.

Synthetic light of the guide lights G1 and G2 from the irradiators 105 and 205 becomes synthetic guide light SG. The irradiator 105 irradiates guide light G1 upward and the irradiator 205 irradiates the guide light G2 downward, respectively, so that synthetic guide light SG being synthetic light of the guide lights G1 and G2 has a fan shape spreading up and down.

Figure 6A:
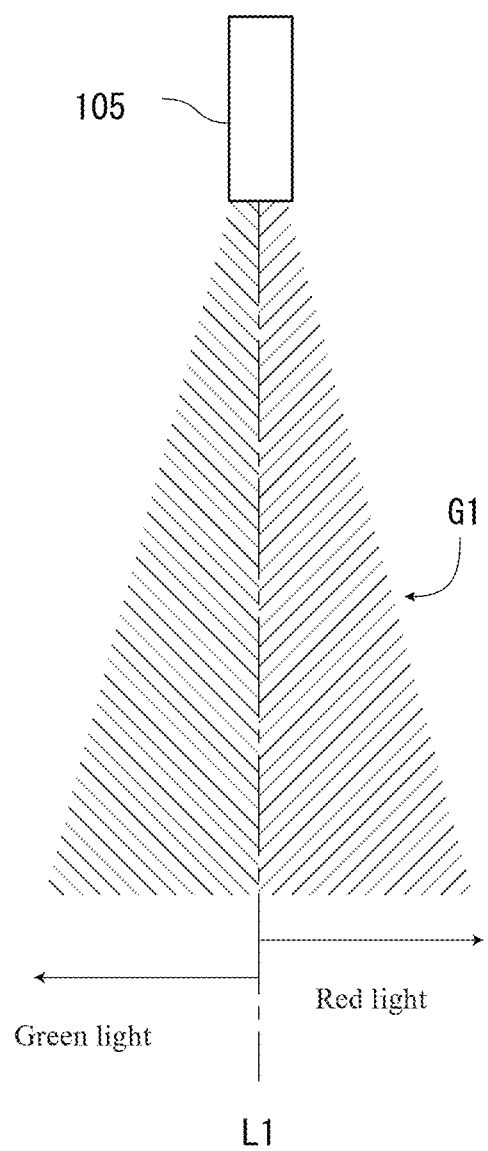
FIGS. 6A and 6B are plan views to describe irradiation ranges of irradiation lights (guide lights)
Figure 6B:
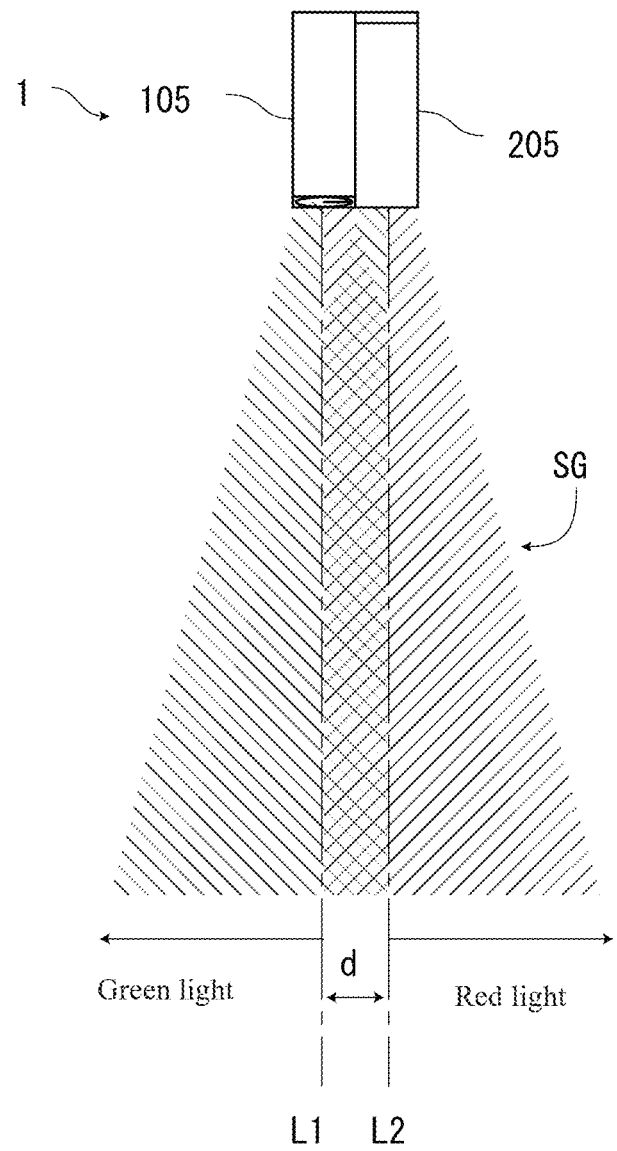

FIGS. 6A and 6B are plan views to describe irradiation ranges of irradiation lights. Irradiation lights from the respective irradiators are hatched. FIG. 6A is given for comparison and illustrates guide light G1 irradiated from a single irradiator 105, and FIG. 6B illustrates synthetic guide light SG irradiated from the guide light irradiation device 1 including the irradiators 105 and 205.

As illustrated in FIG. 6A, the guide light G1 irradiated from the single irradiator 105 is configured so as to include green light on the left side and red light on the right side based on a vertical plane including the optical axis L1 as a reference.

As illustrated in FIG. 6B, in the guide light irradiation device 1 including two irradiators 105 and 205 having the same configuration and juxtaposed left and right, irradiated synthetic guide light SG includes green light on the left side of the optical axis L1 of the irradiator 105 disposed on the left side, and red light on the right side of the optical axis L2 of the irradiator 205 disposed on the right side. In a range in which irradiation lights from the two irradiators overlap, brightnesses are summed, so that a distance at which the synthetic guide light SG is visually recognized becomes longer than that of the guide light G1 in the case using a single irradiator.

Regarding a region with a width d sandwiched between vertical planes including the optical axes L1 and L2, as described above, the width d of this region is a distance d between the lenses of the irradiators 105 and 205, and is equal to or less than the resolution of the human eye as viewed from the assumed use distance A, so that the light sources are recognized as one, and yellow light that is mixed color of the green light and the red light is recognized. However, in actuality, the distance d is several centimeters or less, and the left-right width of the synthetic guide light recognized from the assumed use distance A is several meters, so that the region of the yellow light is sufficiently small and negligible.

According to the configuration described above, as illustrated in FIG. 1, from the guide light irradiation device 1, the synthetic guide light SG that differs in pattern between the left and the right on a horizontal plane centered at a collimation axis of the total station 2 is irradiated. Due to use of the two irradiators, the guide light can be made brighter, a distance at which a person can visually recognize the guide light can be made longer, and a use range can be made larger than in the case using a single irradiator. The synthetic guide light extends long in the vertical direction, so that the device can be used even at a location with level differences.

Second Embodiment

Figure 7A:
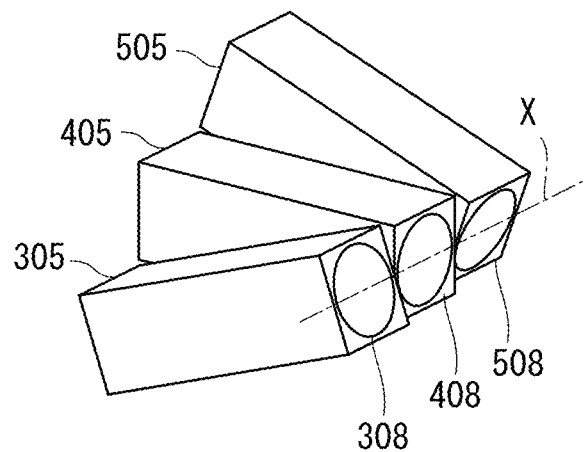
FIGS. 7A, 7B, and 7C illustrate a guide light irradiation device according to a second embodiment, and are explanatory views to describe dispositions of irradiators.
Figure 7B:
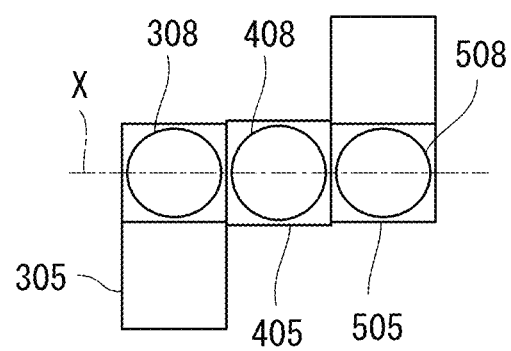
Figure 7C:
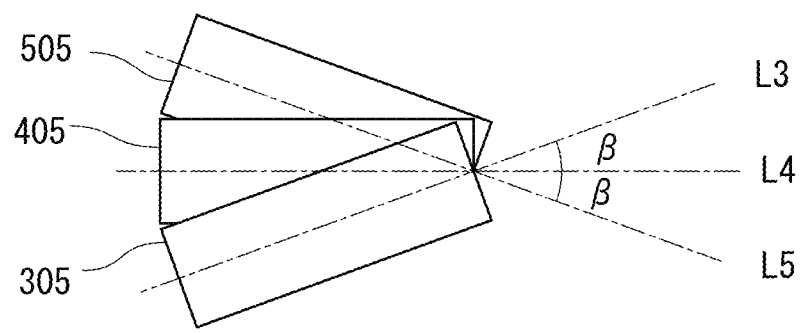
Figure 8:
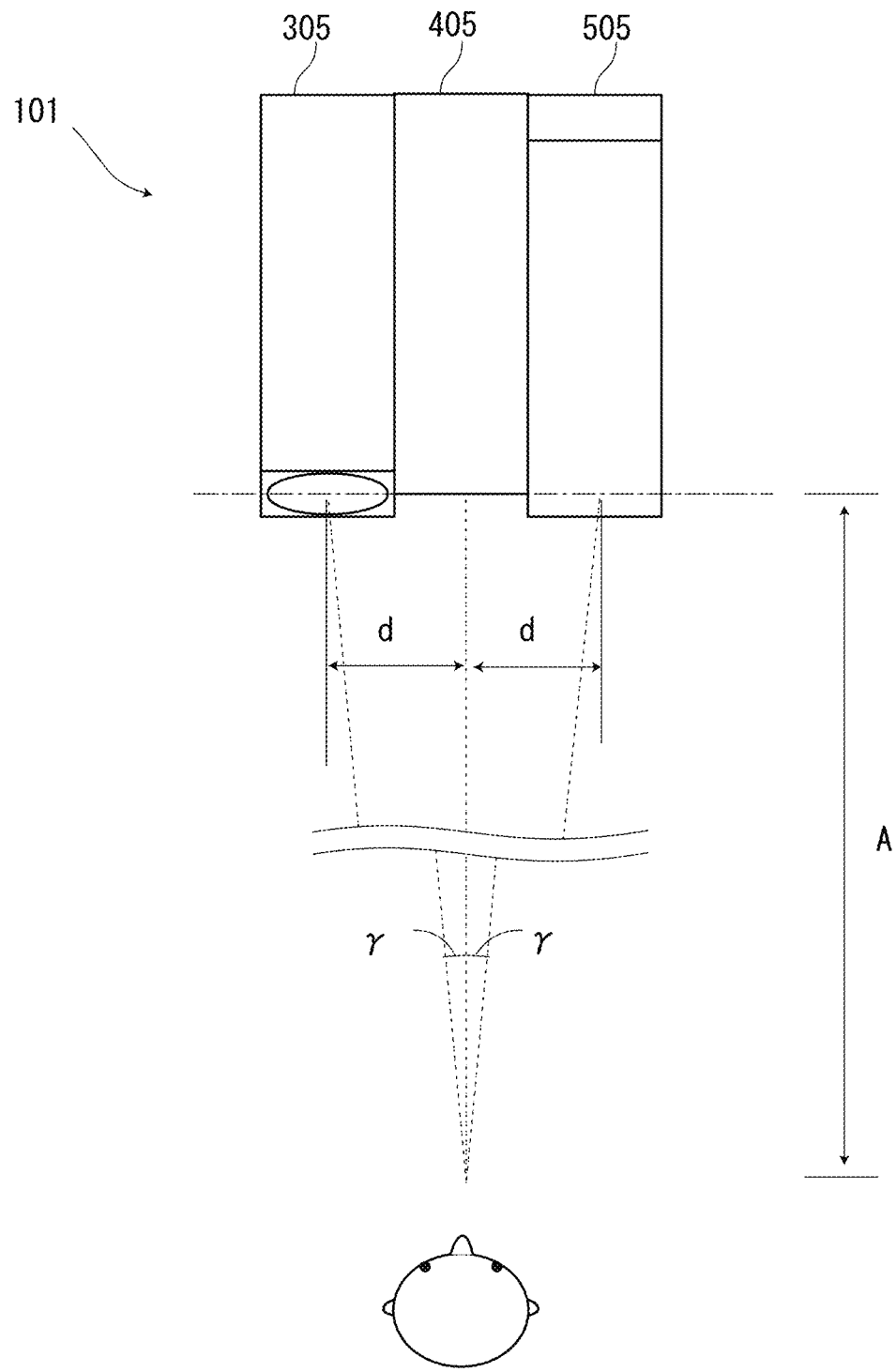
FIG. 8 is a plan view of the same guide light irradiation device.
Figure 9:
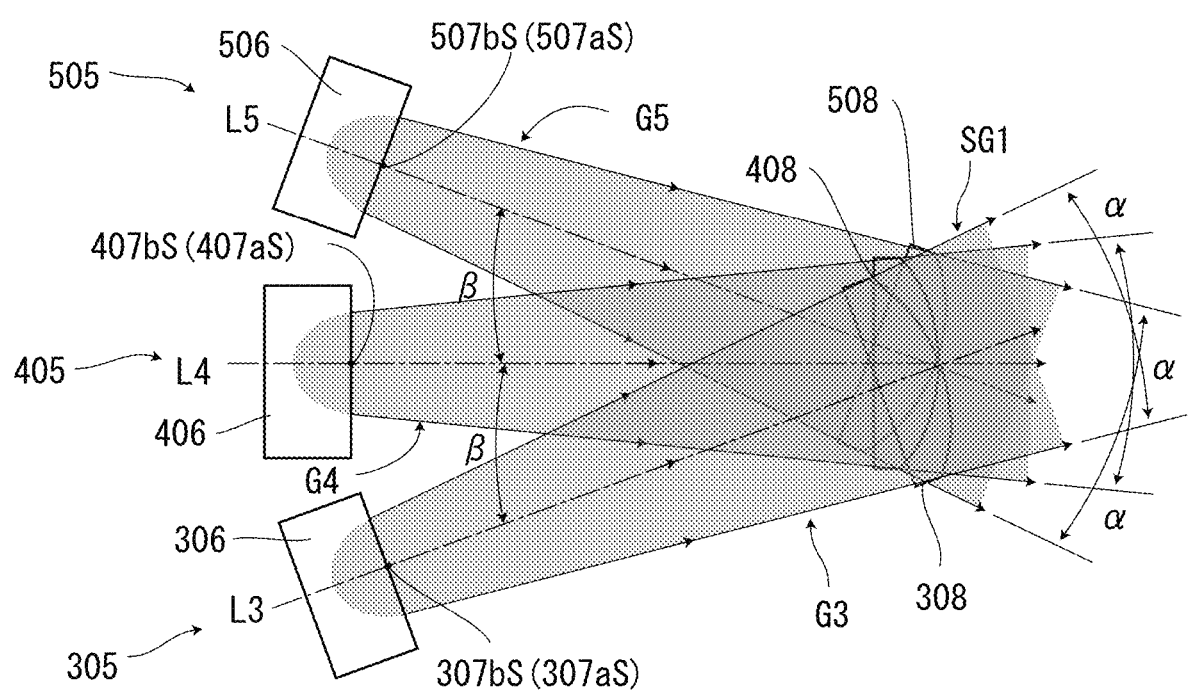
FIG. 9 is a schematic left side view of the same guide light irradiation device, and is an explanatory view to describe a state of irradiation lights and dispositions of components.

Next, a guide light irradiation device 101 according to a second embodiment is described with reference to FIGS. 7A, 7B, 7C, 8, 9, and 10. FIGS. 7A, 7B, 7C, 8, 9, and 10 respectively illustrate the guide light irradiation device 101. FIGS. 7A, 7B, 7C, and 8 are respectively explanatory views describing dispositions of irradiators equipped in the guide light irradiation device, and FIG. 7A is a perspective view, FIG. 7B is a front view, FIG. 7C is a left side view, and FIG. 8 is a plan view. FIG. 9 is a schematic left side view to describe a state of irradiation lights and dispositions of components.

As illustrated in FIGS. 7A, 7B, 7C, and 8, the guide light irradiation device 101 includes three irradiators 305, 405, and 505 configured similarly to the irradiator 105 in the first embodiment.

Even when the number of irradiators becomes three or more, as in the first embodiment, the irradiators 305, 405, and 505 are juxtaposed to be adjacent to each other in the left-right direction, and are disposed so that surfaces with respective lenses 308, 408, and 508 are aligned. Around an axis X passing through the centers of the respective lenses 308, 408, and 508, the irradiator 305 disposed at the left end is rotated an angle β upward and the irradiator 505 disposed at the right end is rotated the angle β downward so that the predetermined angle β is made in the vertical direction between the optical axes (between L3 and L4 and between L4 and L5).

Disposition distances d between the irradiators (distances between the centers of the lenses 308 and 408 and between the centers of the lenses 408 and 508) are configured as in the first embodiment so that, when an assumed use distance of the guide light irradiation device 101 is defined as an assumed use distance A, angles γ between line segments from a point at the assumed use distance A to the respective lenses 308, 408, and 508 become 1 arc-minute (1/60 degrees) or less. (refer to FIG. 8)

As illustrated in FIG. 9, the irradiator 305 includes a pair of light sources 307aS and 307bS, a right-angle mirror 306, and a lens 308, the irradiator 405 includes a pair of light sources 407aS and 407bS, a right-angle mirror 406, and a lens 408, and the irradiator 505 includes a pair of light sources 507aS and 507bS, a right-angle mirror 506, and a lens 508, respectively configured in the same manner as in FIGS. 2A and 2B, and lights emitted from the respective pairs of light sources are formed as guide lights G3, G4, and G5 that differ in pattern between the left and the right by the right-angle mirrors, and exit from the respective lenses. The respective components are disposed by being offset in the left-right direction (in FIG. 9, in a depth direction), and do not interfere with each other.

Synthetic light of the guide lights G3, G4, and G5 from the irradiators 305, 405, and 505 is irradiated as synthetic guide light SG1 from the guide light irradiation device 101.

In a left side view, the guide light G3 of the irradiator 305 disposed at the foremost side is irradiated while tilting upward at an angle β from the horizontal direction, and the guide light G4 of the irradiator 405 disposed at the center is irradiated in the horizontal direction, and the guide light of the irradiator 505 disposed at the backmost side is irradiated while tilting downward at an angle β from the horizontal direction, so that the synthetic guide light SG1 being synthetic light of the guide lights G3, G4, and G5 becomes fan-shaped light extending in the vertical direction.

As in the first embodiment, the predetermined angle β in the vertical direction is configured so as to become equal to or less than a diffusion angle α of the guide lights G3, G4, and G5 in the vertical direction, so that a gap not covered by the synthetic guide light SG1 is not generated. (refer to FIG. 9)

The synthetic guide light SG1 is irradiated while expanding by an angle 2β in the vertical direction, so that the guide light can be extended longer in the vertical direction than the synthetic guide light SG of the first embodiment. Therefore, a guide light irradiation device 101 can be widely used on a survey site with larger level differences, etc.

Figure 10:
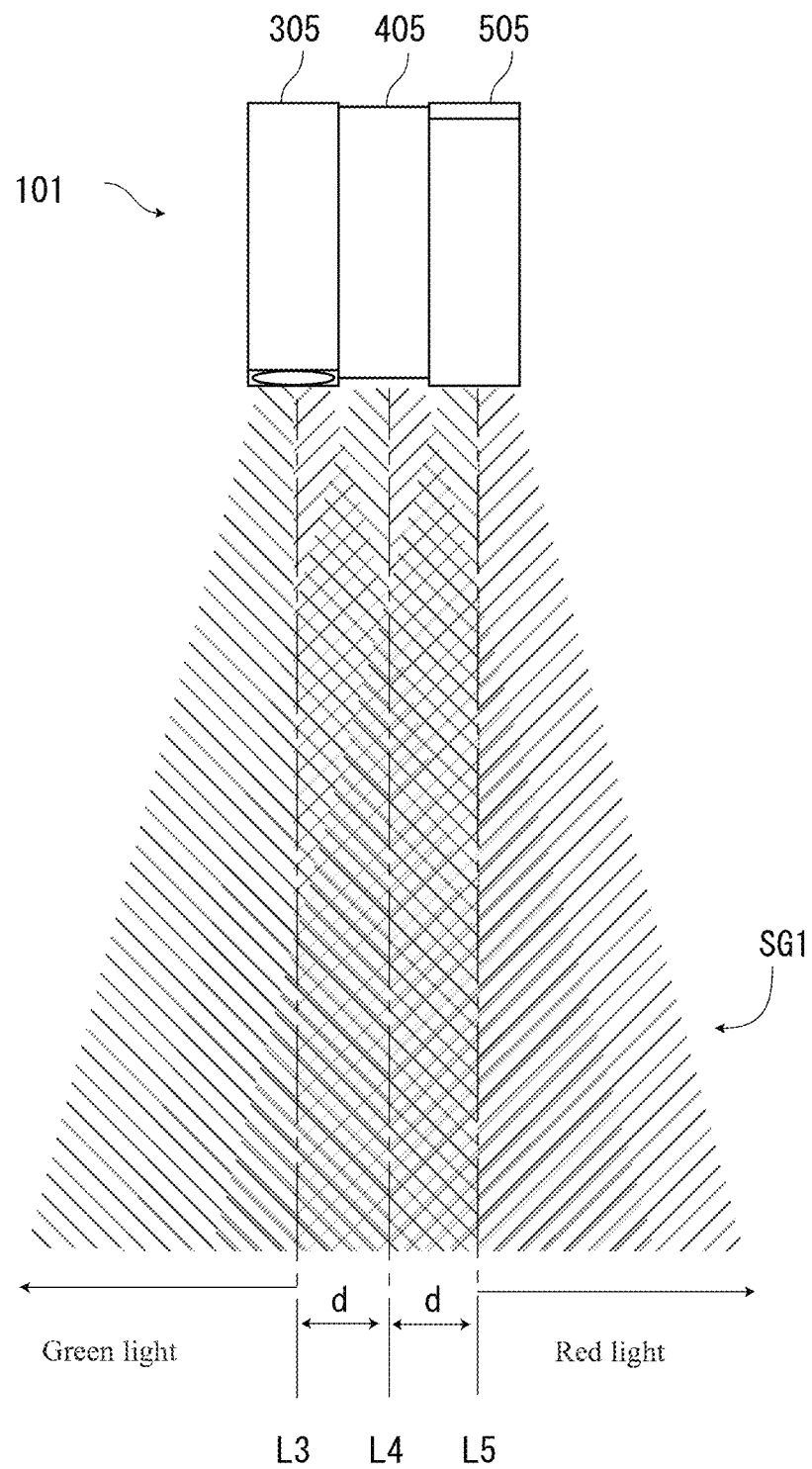
FIG. 10 is a plan view to describe irradiation ranges of irradiation lights (guide lights) of the same guide light irradiation device.

FIG. 10 is a plan view to describe irradiation ranges of irradiation lights of the guide light irradiation device 101. Irradiation lights from the respective irradiators are hatched.

As illustrated in FIG. 10, the synthetic guide light SG1 irradiated from the guide light irradiation device 101 includes, in a planar view, green light on the left side of the optical axis L3 of the irradiator 305 disposed at the left side among the three irradiators, and red light on the right side of the optical axis L5 of the irradiator 505 disposed on the right side. In a region with a width 2d sandwiched by vertical planes including the optical axes L3 and L5, presenting between these lights in two colors, the lights are recognized as yellow light that is mixed-color light of the green light and the red light, however, as in the first embodiment, the width 2d is also several centimeters or less, and is sufficiently small and negligible.

As described above, in a range in which lights irradiated from the plurality of irradiators overlap, brightnesses are summed, so that a distance at which the light is recognized becomes longer than in the case using a single irradiator. In particular, in a range in which all of irradiation ranges of the three irradiators overlap, the brightness becomes higher and the light visual recognition distance becomes longer than those of the guide light G1 obtained by using a single irradiator 105 and the synthetic guide light SG obtained by using two irradiators in the first embodiment. Therefore, as compared with these embodiments, the use distance of the guide light irradiation device 101 can be made longer.

From the guide light irradiation device 101, as in the guide light irradiation device 1 illustrated in FIG. 1, synthetic guide light consisting of green light on the left side and red light on the right side of a boundary plane set to a vertical plane of the collimation axis of the total station 2 is irradiated, and this synthetic guide light extends longer in the up-down direction and has a longer visual recognition distance than the synthetic guide light SG. The use of three irradiators expands the use range, and makes it easier for an operator to find the light.

Although preferred embodiments of the present invention are described above, the embodiments described above are just examples of the present invention. For example, four or more irradiators can also be used, and in this case, by setting the predetermined angle in the vertical direction to β/2, the synthetic guide light can be made brighter, and the use range can be expanded.

The above-described modifications and combinations can be made based on knowledge of a person skilled in the art, and are also included in the scope of the present invention.

REFERENCE SIGNS LIST

1 Guide light irradiation device
2 Total station

3 Prism
4 Pole
105, 205, 305, 405, 505 Irradiator
106, 206, 306, 406, 506 Right-angle mirror
107a, 207a, 307a, 407a, 507a (Red) Light-emitting diode
107b, 207b, 307b, 407b, 507b (Green) Light-emitting diode
108, 208, 308, 408, 508 Lens
A Assumed use distance
d Distance (width)
SG Synthetic guide light
L1 to L5 Optical axis
G1 to G5 Guide light
α Light diffusion angle in vertical direction
β Angle (in vertical direction made between two irradiation directions)

The invention claimed is:

1. A guide light irradiation device to irradiate guide light to indicate a direction to a survey operator, comprising:
a plurality of irradiators, each of which is configured to irradiate guide light differing in pattern between the left and the right of a center based on a vertical plane that includes an optical axis of the irradiator,
wherein:
the plurality of irradiators are juxtaposed in a left-right direction so that the vertical planes including their respective optical axes are parallel,
irradiation units of the plurality of irradiators are disposed so that the irradiation units match in the horizontal direction, and
optical axes of the plurality of irradiators make a predetermined angle with each other in the vertical direction, and
synthetic light of guide lights respectively irradiated from the plurality of irradiators is irradiated as synthetic guide light.

2. The guide light irradiation device according to claim 1, wherein each of the plurality of irradiators includes a pair of light sources configured to emit lights for left and right patterns of the guide light, an optical member configured to form lights emitted from the pair of light sources as light differing in pattern between the left and the right, and a projector lens as the irradiation unit configured to transmit the guide light.

3. The guide light irradiation device according to claim 1, wherein the predetermined angle in the vertical direction between the optical axes of the plurality of irradiators is configured to become smaller than a diffusion angle of the guide light in the vertical direction in a single one of the irradiators.

4. The guide light irradiation device according to claim 1, wherein a distance between the irradiation units of the plurality of irradiators is configured so that an angle between line segments from a point at an assumed use distance of the guide light irradiation device to the respective irradiation units becomes 1 arc-minute or less.

5. The guide light irradiation device according to claim 1, wherein the plurality of irradiators are affixed in the juxtaposition in a left-right direction so that the vertical planes including their respective optical axes are parallel.

* * * * *